APPARATUS AND METHOD FOR CONTACTING FLUIDS AND SOLIDS
Filed March 9, 1959 2 Sheets-Sheet 1
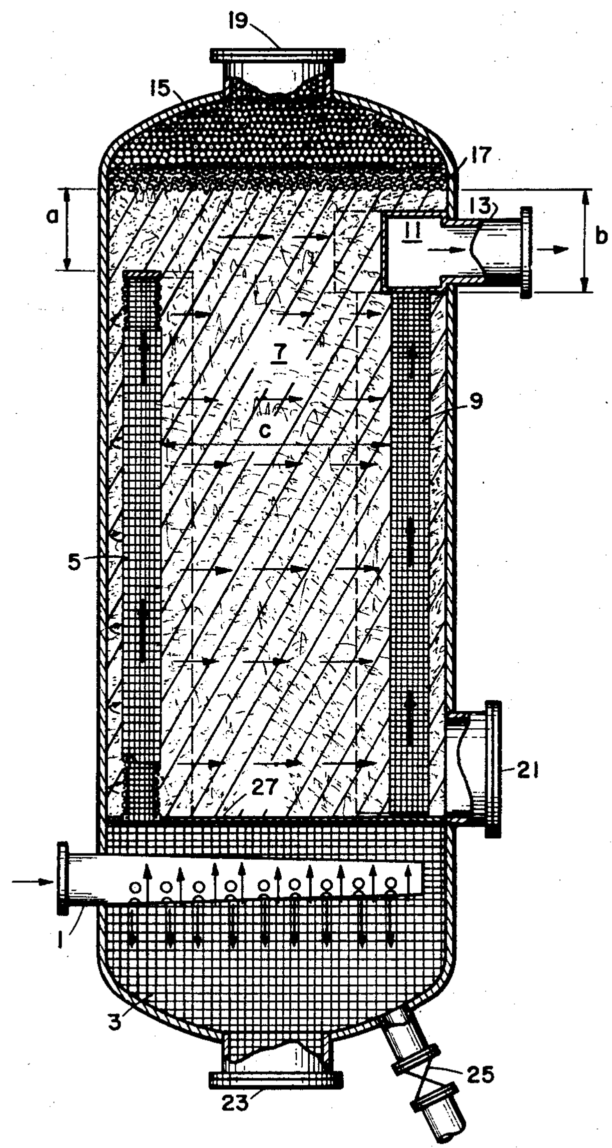
FIG. I
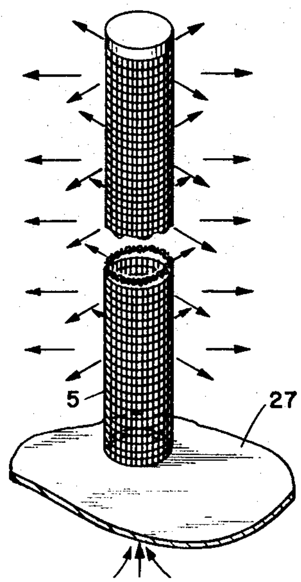
FIG. II
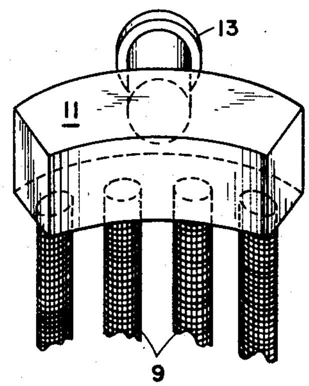
FIG. III
INVENTOR:
ALLEN COLLINS
BY: John H. Colvin
HIS ATTORNEY Nov. 22, 1960 A. COLLINS 2,961,304
APPARATUS AND METHOD FOR CONTACTING FLUIDS AND SOLIDS
Filed March 9, 1959 2 Sheets-Sheet 2
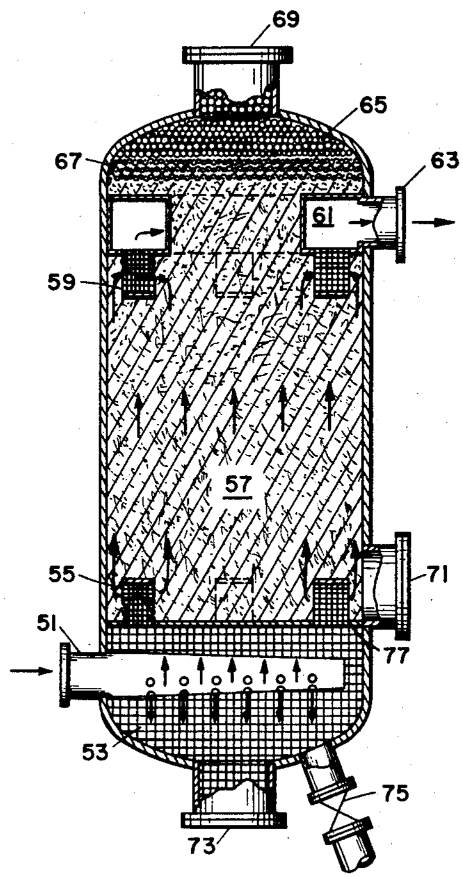
FIG. IV
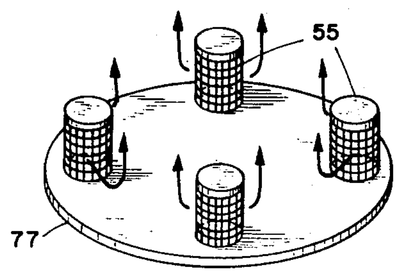
FIG. V
INVENTOR:
ALLEN COLLINS
BY: John H. Colvin
HIS ATTORNEY 2,961,304

Patented Nov. 22, 1960

2,961,304

APPARATUS AND METHOD FOR CONTACTING FLUIDS AND SOLIDS

Allen Collins, Edwardsville, Ill., assignor to Shell Oil Company, New York, N.Y., a corporation of Delaware Filed Mar. 9, 1959, Ser. No. 798,269

3 Claims. (Cl. 23—288.59)

This invention relates to a new and improved apparatus and method for contacting fluids and solids, especially in a fixed foraminous bed.

It is a common practice to carry out many chemical reactions and treatments by contacting the reactants in a fluid state with a solid contacting agent at suitable conditions of temperature, pressure, time, etc. It is also common practice that such fluid-solid contacting operations are conducted so that the solid contact agent is in the form of a fixed foraminous bed, through which the fluid is passed and thus contacted with the surface of the contacting agent. The solid contacting agent is frequently in the form of granules, cylindrical pellets, or spheres and the like in order that a foraminous bed be formed therewith. The path of the fluid through such a foraminous bed may be essentially upflow, downflow, crossflow, or any combination thereof which results in thorough contacting of all the fluid with the surface of the contacting agent. Many chemical processes employ fluid-solid contacting steps, among the best known of which are many catalytic processes employed in the processing of petroleum hydrocarbons. Examples of petroleum processes which employ a fixed foraminous bed for the contacting of vapors are catalytic cracking, catalytic reforming, hydrodesulfurization, dehydrogenation, and hydrocracking processes.

In passing a fluid through a bed of solids, a certain amount of energy in the form of pressure is expended to force the fluid through the bed. Thus, there is a pressure drop between the inlet and outlet of such a process. In continuously contacting fluids with solids, the pressure drop over the bed of solids generally increases gradually as the length of the run is increased. This increase is caused by the accumulation of attrited particles from the contacting solids, corrosion products, and other solid materials contained in the feed, in such a manner that the fluid flow is restricted. The contact solids may be attrited in a number of ways such as expansion and contraction of the bed during heating and cooling cycles, kinetic action of the fluid and abrasive materials contained therein, tendency of the bed to be fluidized in upflow operations, compression and movement of the bed because of thermal expansion, weight of the bed of contacting solids, downflow operation, etc. Corrosion products may frequently be entrained in the feed from the inlet lines to the process, or from corrosion of the process vessel itself. As an example of the former, in the hydrodesulfurization of petroleum hydrocarbons containing high amounts of sulfur, large amounts of corrosion products are frequently formed in the preceding heating step, which products are entrained with the vaporized feed in the form of scale or powder and carried into the desulfurzation zone where the vapors are contacted with a solid bed of catalyst.

Because of these factors, the pressure drop, and consequently the pressure required to pass the fluid through the contacting solids, gradually increases during continuous operation until it is necessary to shut down the process and remove the obstructing materials. Even small increases in pressure drop across the contacting bed may become critical in such processes as hydrotreating where extremely high recycle gas rates are employed, and in processes where a series of fluid-solids contacting steps are carried out. Therefore, it is very important in order to make longer runs that the rate of pressure differential buildup be kept at a minimum value, consistent with maintaining proper operation of the process in other respects such as throughput, contacting efficiency, etc. Other advantages to be obtained from reducing the rate of pressure drop buildup are that the tendency of the feed to channel or bypass is lessened, and lower pressure drops permit operation with lower inlet pressures thus reducing the power requirements for feed pumps and even reducing the required vessel wall thickness. Likewise, lower pressure drops permit operation at greater throughputs with existing pumping facilities.

Various means have been suggested for the solution to the problem of high pressure drop buildup in fixed bed fluid-solid contacting processes. For example, the problem of corrosion products in the feed may be solved by the proper choice of high alloy materials of construction in the areas of corrosion. However, such alloys are extremely expensive and thus the process becomes less economical because of excessive initial costs. Cyclone-type separators or centrifuges have also been used, but such of these have sufficient velocities to remove all of the finely-divided particles are frequently susceptible to plugging by coarser particles which may be present in the feed. In addition, if cyclones are used in high pressure processes, their cost is prohibitively high unless they are located within the contacting vessel. Moreover, if cyclones are placed within the contacting vessel, the size of the vessel must be increased greatly to accommodate them, thus adding excessively to the initial cost of the process.

It is, therefore, an object of this invention to provide a method for contacting fluids with solids in such a manner that the rate of pressure-drop increase and the rate of plugging are reduced. It is a further object of this invention to provide an improved fluid-solids contacting apparatus or device by which the plug-forming materials are removed from the feed prior to the contacting step, and in which the causes of increased pressure drop inherent to the use of a solid bed are thereby greatly reduced.

These and other objects will be apparent in the description of the invention which is made with reference to the accompanying drawing, wherein:

Figure I illustrates a preferred embodiment of the invention in which the flow of fluid through a bed of contacting solids is horizontal;

Figure II illustrates a preferred embodiment of an inlet feed distribution means;

Figure III illustrates a preferred embodiment of the fluid outlet header as in the device of Figure I;

Figure IV illustrates a preferred embodiment of this invention in which the flow of fluid through a bed of contacting solids is essentially vertical and upward;

Figure V illustrates a preferred configuration of the inlet distributing zones when upflow contacting is employed as in the device of Figure IV.

Referring to Figure I, in which the flow of fluid is cross-flow or horizontal, the fluid feed, which may be either liquid, vapor, or mixtures thereof, is admitted through an inlet passageway 1 extending into an inlet filtration zone 3. The inlet passageway 1 is open on the discharge end and has a number of openings along its lower surface in order that a portion of the incoming fluid is directed downward, thus distributing the incoming fluid more evenly throughout the filtration zone 3. The filtration zone 3 is filled with a filtering means, such as knitted wire mesh, to remove any entrained solids in the incoming fluid. The feed fluid, substantially freed of all entrained solids, is then passed from the inlet zone 3 upward through one or a number of distributing zones 5 extending into and communicating with a foraminous bed of contacting solids 7 bearing upon a support means such as solid support plate 27. The fluid to be contacted is then passed from the distributing zones 5 in an essentially horizontal direction of flow through the bed of contacting solids 7 to an outlet collecting means 9, through which the contacted fluid passes to an outlet means consisting of a header 11 and discharge nozzle 13, through which the contacted fluid is discharged.

An anti-fluidizing zone is formed above the bed of contacting solids by one or a number of layers of metallic corrosion-resistant wire matting 17 bearing upon the top surface of the catalyst bed, and a layer of inert particulate solids 15 having a particle size greater than the interstitial openings of the demister matting. The layer of inert solids, which is preferably packed, completely fills the upper section of the vessel and bears upon and at least partially compresses the demister matting 17 thus maintaining the bed of contacting solids in a tightly-packed condition. It is, of course, important that the matting be capable of further compression during operation of the vessel. It is therefore preferred to employ matting having a thickness of at least four inches in order that the matting be able to absorb any motion of the bed by further compression as well as to maintain the layer of inert solids in a packed condition. In order to reduce further any bypassing of fluid through the anti-fluidizing zone, it is preferred that the sum of the distance ($a$) from the bottom of the matting to the top of the inlet pipe screens and the distance ($b$) from the bottom of the matting to the top of the outlet pipe screens exceed the horizontal distance ($c$) between the inlet and outlet pipe screens. Flexible wire mesh such as that which is manufactured by the Metal Textile Corporation or the Otto H. York Company is suitable for the purposes of this invention. The fluid-solids contacting device is, of course, equipped with appropriate means, such as manways 19, 21, 23 for maintenance and cleanout access. In addition, it is preferred that means for cleanout during operation, such as blowdown nozzle and valve 25, be provided in the bottom of the inlet zone 3, so that solids accumulated in the bottom of the inlet zone may be removed periodically by pressure without taking the vessel completely out of service to clean the inlet zone manually.

In Figure 1, a preferred embodiment of the inlet passageway 1 is shown in which the passageway comprises a horizontally placed cylindrical pipe in which the open discharge end is constricted. In the lower half of the inlet passageway, several holes or slots are drilled. The pressure of incoming fluid thus forces a significant portion of the fluid through the holes in the bottom of the passageway, thereby obtaining a more uniform distribution of feed through the inlet filtration zone.

Inlet zone 3 is of such cross-sectional area that a substantial decrease in velocity of the feed fluid will occur therein, thereby facilitating the removal of entrained solids. It is preferred that the area be at least ten times as great as the cross-sectional area of the inlet passageway 1, and it is further preferred that the cross-sectional area of the inlet zone be thirty times as great or even greater.

It is preferred that the inlet zone 3 be filled with demister matting as a filtering means. Such demister matting consists of pads or blankets made of multiple layers of flexible knitted wire mesh. In one commercially-available type of demister matting, each layer of knitted wire mesh is crimped diagonally, and the direction of the crimp is alternated in the successive layers thereby creating a maze of unaligned unsymmetrical openings. A typical demister matting of this type has a 98% free volume. Such matting is well known in the art of mist elimination and the separation of other entrained liquids from vaporous streams. However, it has been found that this material may also be used advantageously for the removal of solids from liquids and vapors. Thus, entrained solids are removed from the feed fluid by impingement upon the wire mesh. Part of the separated solids are retained in the wire mesh, while the remaining part of the separated solids fall or are "washed" to the bottom of the inlet zone 3 since they are heavier than the entraining fluid. The deposition of separated solids in the bottom of the inlet zone is of course facilitated by the lower linear velocity of the fluid therein.

Figure II illustrates a preferred embodiment of the feed distribution zone 5, in which said zone comprises at least one cylindrically-formed wire screen or pipe screen having a mesh opening slightly smaller than the least dimension of the foraminous contacting solids, which screen is attached to the bottom support plate 27 in registry with an opening therein having about the same diameter as the cylindrically-formed screen. The upper end of the pipe screen is closed so that the entire flow of fluid through the pipe screen is through the cylindrical screen wall. Bypassing of fluids above the contacting bed through the anti-fluidizing zone is thus essentially avoided. As mentioned above, the choice of screen size and openings will be governed largely by the size of the contacting solid particles. However, it will also be affected to some extent by the attritional and plugging tendencies of the contacting solids, the static pressure head of solids bearing upon the screens, and the allowable initial pressure drop. The structural strength of the screens may be reinforced if necessary by means of spacers, spiders, and other reinforcing means which will be apparent to anyone skilled in the art of structural design.

The outlet collecting means 9 are also preferably pipe screens of a type similar to the inlet pipe screens. However, they are supported from support plate 27 and do not communicate with the inlet zone 3. The number of inlet and outlet pipe screens may be only one of each or a plurality of each may be used. This is determined largely by the configuration of the containing vessel, of the bed of contacting solids, and by the desired flow pattern for the fluid to be contacted. It is generally preferred to use more than one inlet and outlet pipe screen in order that the flow of fluid be distributed evenly through a maximum volume of contacting solids. By this means the contacting efficiency for a given residence time in the contacting vessel is also maximized. The upper end of the outlet pipe screen is open and communicates with the outlet header 11 through which the contacted fluid is passed to the outlet nozzle 13. The cross-sectional area of both the outlet header and nozzle should be at least as great as the cross-sectional area of the inlet passageway 1. It is preferred that they be of at least 30% greater cross-section in order to offset partially the additional pressure drop which may be incurred in some processes by expansion and vaporization of the fluid during contacting. A preferred embodiment of the outlet header and nozzle is shown in Figure III.

Referring to Figure IV, in which an upflow contacting device is illustrated, the fluid feed is supplied through an inlet passageway 51 extending into the inlet filtration zone 53 which passageway is open on the discharge end and has a number of openings along the lower surface in order that a portion of the incoming fluid be directed downward thus distributing the flow more evenly throughout the inlet zone 53 which is filled with a filtering means such as demister matting. The feed fluid substantially freed of all solids materials then flows upwards through one or a number of distributing zones 55, which can suitably be cylindrical pipe screens or cones, which extend a short distance into the bed of contacting solids 57. The fluid is then passed upward through the bed of contacting solids 57. The contacted fluid is passed through one or a number of outlet collecting means 59, such as pipe screens, into an outlet means such as header 61 which communicates with an outlet nozzle 63 through which the contacted fluid is discharged.

Referring to Figure V which is an isometric view of the distributing zones and support plate as illustrated in Figure IV, it will be noted that a number of distributing zones 55 having solid tops are employed to distribute the flow of fluid more evenly in the bed of contacting solids 57. The distributing zones extend only a short distance upward through the bed of contacting solids 57, this distance being governed largely by the free discharge area required.

The total free discharge area of the inlet distributing zones should be at least as great as the discharge area of the inlet passageway. Using this as a measure of the minimum discharge area required, the configuration and placement of the inlet distributing zones is determined by considerations of the rate of flow and flow patterns through the contacting bed. In an analogous manner, the configuration and placement of the outlet distributing zones is also determined by the same considerations. However, the total minimum discharge area of the outlet zones should be at least 25% greater than the discharge area of the inlet passageway to allow for fluid expansion due to pressure drop and the formation of additional vapors during the contacting step. It is preferred that the inlet and outlet zones extend only a short distance into the bed (consistent with obtaining adequate free discharge area) in order that the length of the path of upward-flowing fluid through the contacting solids be maximized.

The defluidizing zone of this invention operates to reduce the plugging tendency of the fluid-solids process in at least two ways:

(1) The weight of the layer of inert solids bearing upon the bed of contacting solids directly opposes any motion of the contacting solids, thus minimizing attrition of the contacting solids by fluidization.

(2) The flexible layer of demister matting, which lies between the packed bed of inert solids and the contacting solids, permits free thermal expansion and contraction of the bed of contacting solids, thus avoiding attrition of the contacting solids which would be incurred if the contacting solids were allowed to expand directly against the inflexible layer of inert solid particles.

The advantages of the invention in reducing pressure drop buildup may be observed in the following example:

In a commercial catalytic desulfurization unit, a light straight run distillate having an ASTM initial boiling point of 340° F. and an ASTM end point of 525° F. and having a sulfur content of 0.59 percent by weight was desulfurized at the rate of 13,100 barrels per day by heating the feed to a temperature of about 630° F. at a furnace discharge pressure of 475 pounds per square inch, and passing the heated feed along with 2.25 moles of hydrogen per mole of feed, the hydrogen having been heated to the same temperature, to two 54 inch I.D. by 16 feet downflow reaction vessels which are operated in parallel and which contain a fixed foraminous bed of pelletized cobalt/molybdenum catalyst. The reactor effluent, consisting mainly of unused hydrogen, hydrogen sulfide, and desulfurized product is then cooled to condense the normally-liquid products. The normally gaseous portions of the effluent are then flashed off and at least part of the hydrogen-rich portion thereof is treated to remove hydrogen sulfide and recycled the outlet of the pre-heat furnace. The normally liquid product is then stabilized by distillation.

In the above-described installation, considerable difficulty was experienced with plugging of the bed due to accumulation of corrosion scale and fines which were introduced into the contacting vessel by entrainment in the vaporous feed. To mitigate this, cylindrical basket screens were inserted into the top of the beds thus increasing the area of catalyst bed exposed to the entrance vapors, and also increasing the amount of scale which could accumulate before plugging of the bed necessitated shutdown for cleanout. This was not effective, and run lengths continued to be limited by the rate of plugging. A tangential feed inlet line in conjunction with a circumferentially placed collection trough were also employed in both reactors in an effort to de-entrain the plug-forming fines by centrifugal action and thus reduce the rate of plugging of the bed. This, likewise, was not successful.

The reactors were then changed to a cross-flow design similar to that of Figure 1, but differing in the following ways:

(1) A conventional inlet nozzle was employed.

(2) The inlet zone below the catalyst support plate contained no filtration means.

(3) The reaction vessels were merely filled with catalyst to a point just below the top access manway.

After a catalyst age of only 22 barrels of feed per pound of catalyst, the pressure drop over the catalyst bed had increased by nine pounds per square inch due to the accumulation of corrosion and attrition fines.

In the same unit, the reactors were then modified as in Figure I by (1) extending the feed inlet line into the inlet zone; (2) filling the inlet zone with wire mesh; and (3) adding an anti-fluidizing zone above the catalyst layer, which zone consisted of two layers of knitted wire mesh demister matting above which was placed a packer layer of mixed 1/4 and 3/8 inch alumina balls. The pressure drop over the catalyst bed did not measurably increase even after a catalyst age of 22 barrels of feed per pound of catalyst had expired. Moreover, after a catalyst age of over 50 barrels of feed per pound of catalyst, the pressure drop over the catalyst had still not measurably increased.

It is recognized that when the invention is used for contacting mixtures of vapors and liquids with solids that the liquid will tend to be de-entrained from the vapor into the wire mesh-filled inlet zone. It is therefore preferred that the feed be essentially completely liquid or vapor when using cross-flow operation. Conversely, when the feed contains substantial quantities of both liquid and vapors, it is preferred to employ upflow operation through the bed of contacting solids.

We claim as our invention:

1. Apparatus for contacting fluids containing small amounts of entrained solids with a foraminous bed of solids which comprises an enclosed vessel having a feed inlet passageway extending into a lower inlet zone having a cross-sectional area at least ten times as great as said inlet passageway and filled with knitted wire mesh surrounding said inlet passageway, at least one fluid distributing means in communication with and extending from said filtration zone vertically upward into a fixed bed of foraminous contacting solids, a fixed foraminous bed of contacting solids bearing upon a support means, an anti-fluidizing zone consisting of a layer of packed inert particulate solids atop a layer of knitted wire mesh bearing upon the top surface of said bed of contacting solids, at least one collecting means for the contacted fluid extending into said bed of contacting solids and in communication with an outlet collecting means through which the contacted fluid is discharged.

2. The apparatus of claim 1 in which the flow of fluid through the bed of contacting solids is essentially crosswise.

3. The apparatus of claim 1 in which the flow of fluid through the bed of contacting solids is essentially upward.

References Cited in the file of this patent

UNITED STATES PATENTS

| | | |
|---|---|---|
| 2,330,068 | Marancik et al. | Sept. 21, 1943 |
| 2,342,080 | Kalichevsky | Feb. 15, 1944 |
| 2,722,501 | Kassel | Nov. 1, 1955 |